US012759243B2

(12) United States Patent
Schirmeister et al.

(10) Patent No.: US 12,759,243 B2
(45) Date of Patent: Oct. 13, 2026

(54) PRINTING PLATFORM FOR EXTRUSION ADDITIVE MANUFACTURING

(71) Applicants: Basell Polyolefine GmbH, Wesseling (DE); Albert-Ludwigs-Universität Freiburg, Freiburg (DE)

(72) Inventors: Carl Gunther Schirmeister, Denzlingen (DE); Erik Hans Licht, Mainz (DE); Karsten Schmitz, Hofheim/Ts. (DE); Yannic Kessler, Kriftel (DE); Klaus Klemm, Mainz (DE); Jürgen Rohrmann, Kelkheim (DE); Dieter Langenfelder, Niedernhausen (DE); Mikhail Dureev, Butzbach (DE); Rolf Muelhaupt, Freiburg (DE); Mirco Müller, Pforzheim (DE); Steer Peter, Munich (DE); Kolano Benjamin, Munich (DE)

(73) Assignees: Basell Polyolefine GmbH, Wesseling (DE); Albert-Ludwigs-Universität Freiburg, Freiburg (DE)

( * ) Notice: Subject to any disclaimer, the term of this patent is extended or adjusted under 35 U.S.C. 154(b) by 383 days.

(21) Appl. No.: 18/547,898

(22) PCT Filed: Jan. 26, 2022

(86) PCT No.: PCT/EP2022/051689

§ 371 (c)(1),
(2) Date: Aug. 25, 2023

(87) PCT Pub. No.: WO2022/179788

PCT Pub. Date: Sep. 1, 2022

(65) Prior Publication Data

US 2024/0131802 A1 Apr. 25, 2024
US 2024/0227311 A9 Jul. 11, 2024

(30) Foreign Application Priority Data

Feb. 26, 2021 (EP) .................................... 21159520

(51) Int. Cl.

| | |
|---|---|
| ***B29C 64/40*** | (2017.01) |
| ***B29C 64/118*** | (2017.01) |
| ***B29K 23/00*** | (2006.01) |
| ***B33Y 10/00*** | (2015.01) |
| ***B33Y 30/00*** | (2015.01) |
| ***B33Y 70/00*** | (2020.01) |

(52) U.S. Cl.

CPC ............ *B29C 64/40* (2017.08); *B29C 64/118* (2017.08); *B29K 2023/06* (2013.01); *B29K 2023/12* (2013.01); *B33Y 10/00* (2014.12); *B33Y 30/00* (2014.12); *B33Y 70/00* (2014.12)

(58) Field of Classification Search

CPC ...... B29C 64/40; B29C 64/118; B29C 64/245
See application file for complete search history.

(56) References Cited

U.S. PATENT DOCUMENTS

| | | | | |
|---|---|---|---|---|
| 4,399,054 | A | 8/1983 | Ferraris et al. | |
| 4,469,648 | A | 9/1984 | Ferraris et al. | |
| 7,388,061 | B2 | 6/2008 | Gao et al. | |
| 2015/0337140 | A1* | 11/2015 | Romick | C09D 123/06 428/424.8 |
| 2019/0232554 | A1* | 8/2019 | De Palo | B29C 64/118 |
| 2019/0283322 | A1* | 9/2019 | De Palo | C08L 23/12 |
| 2020/0282635 | A1* | 9/2020 | Liu | B29C 64/245 |
| 2020/0290269 | A1* | 9/2020 | Okonski | B33Y 70/10 |
| 2021/0095115 | A1* | 4/2021 | Baird | B29C 64/118 |

FOREIGN PATENT DOCUMENTS

| | | | |
|---|---|---|---|
| EP | 45977 | A2 | 2/1982 |
| EP | 361493 | A1 | 4/1990 |
| EP | 395083 | A2 | 10/1990 |
| EP | 0572028 | A1 | 12/1993 |
| EP | 728769 | A1 | 8/1996 |
| EP | 1012195 | A1 | 6/2000 |
| EP | 3650496 | A1 | 5/2020 |
| WO | 98/44009 | A1 | 10/1998 |
| WO | 98/056830 | A2 | 12/1998 |
| WO | 98/056833 | A1 | 12/1998 |
| WO | 98/056834 | A1 | 12/1998 |
| WO | 00/55215 | A1 | 9/2000 |
| WO | 00/63261 | A1 | 10/2000 |
| WO | 02/100904 | A1 | 12/2002 |

(Continued)

OTHER PUBLICATIONS

NuCera: p. 1, "Ceramer polymers are formed by grafting maleic anhydride derivatives onto hydrocarbon polymers", available at—available at—available at https://nucerasolutions.com/specialty-polymers. (Year: 2025).*

Yuan et. al., "Specialty Low Molecular Weight Polyolefins for Digital Printing Applications" in Proc. IS&T Int'l Conf. on Digital Printing Technologies and Digital Fabrication (NIP23), 2007, pp. 265-269, available at https://doi.org/10.2352/ISSN.2169-4451.2007.23.1.art00063_1 (Year: 2007).*

International Search Report and Written Opinion for PCT/EP2022/051689 mailed Sep. 1, 2022.

*Primary Examiner* — Inja Song

(57) ABSTRACT

An extrusion-based additive manufacturing process including the step of selectively depositing a molten thermoplastic material (P) on a film or sheet made from or containing a polymer blend obtained by melt blending a mixture made from or containing:

(A) 60% to 98.8% by weight of a polyolefin;

(B) 0.1% to 30% by weight of a compatibilizer;

(C) 0.05% to 20% by weight of an amino resin; and (D) 0% to 5% by weight of an additive, wherein the amounts of (A), (B), (C) and (D) are based on the total weight of (A)+(B)+(C)+(D).

12 Claims, No Drawings

(56) References Cited

FOREIGN PATENT DOCUMENTS

| | | | |
|---|---|---|---|
| WO | 07/57160 | A2 | 5/2007 |
| WO | 2010/078494 | A2 | 7/2010 |
| WO | 2011/061134 | A1 | 5/2011 |
| WO | 2014105466 | A2 | 7/2014 |
| WO | 2017221801 | A1 | 12/2017 |
| WO | 2018065244 | A1 | 4/2018 |
| WO | 2020/169423 | A1 | 8/2020 |

* cited by examiner

PRINTING PLATFORM FOR EXTRUSION ADDITIVE MANUFACTURING

This application is the U.S. National Phase of PCT International Application PCT/EP2022/051689, filed Jan. 26, 2022, claiming benefit of priority to European Patent Application No. 21159520.2, filed Feb. 26, 2021, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to an extrusion-based additive manufacturing process.

BACKGROUND OF THE INVENTION 3D printing of plastic materials is a fast-evolving technology. In 3D printing, also referred to as additive manufacturing, the movement of a printing head with respect to the substrate is performed under computer control, in accordance with build data that represent the 3D article to be printed. The build data are obtained by slicing the digital representation of the 3D article into multiple horizontal layers. Then, for each layer, the computer generates a build path to form the 3D article.

Various technologies have been developed for the additive manufacturing of plastic objects, such as extrusion-based processes, powder-bed fusion, and selective laser sintering.

Extrusion-based additive manufacturing is 3D printing process, wherein the molten plastic material is selectively dispensed through a nozzle or an orifice. In some instances, the extrusion-based 3D printing process is a filament-based process, wherein the plastic material is fed to the 3D printer in the form of a filament, or a pellet-based process, wherein the plastic material is fed to the printing device in pelletized form.

The first layer of the printed plastic material solidifies and bonds to the printing platform of the 3D printer. The bond between the printed plastic material and the printing platform holds the material in place, preventing any displacement during the addition of the subsequently printed layers.

In some instances, insufficient adhesion of the printed material to the printing platform leads to premature detachment or slippage of the printed layers, resulting in a flawed structure of the printed article.

In some instances, sufficient adhesion prevents premature detachment of the material from the plate or warping due to thermal shrinkage. In some instances, warping causes the corners of printed articles to lift and detach from the printing platform, thereby leading to the deformation of the articles.

In some instances and at the completion of the printing process, the 3D printed article is removed from the printing platform. If the printed plastic material is easily removed from the printing platform, it is less likely that the 3D printed article will be deformed or damaged by removal.

In some instances, printing platforms are made of glass or metal. In some instances, flexible materials and coatings cover the printing platform of 3D printers and are adapted to the plastic material to be printed.

Some printing plates or coatings are sticky and leave sticky residues on printed articles. In some instances, the residues are removed.

Polyolefins, such as polypropylene and polyethylene, are emerging as printing materials in extrusion-based additive manufacturing. In some instances, printed articles obtained from polyolefins have a pronounced tendency to warp, thereby dictating the use of strong adhesion of the printed article to the printing plate.

SUMMARY OF THE INVENTION

In a general embodiment, the present disclosure provides a film or sheet made from or containing:

a polymer blend obtained by melt blending a mixture made from or containing (A) 60% to 98.8% by weight of a polyolefin;

(B) 0.1% to 30% by weight of a compatibilizer;

(C) 0.05% to 20% by weight of an amino resin; and (D) 0% to 5% by weight of an additive, wherein the amounts of (A), (B), (C), and (D) are based on the total weight of (A)+(B)+(C)+(D), the total weight being 100%.

In some embodiments, the present disclosure provides an extrusion-based additive manufacturing process including the step: (a) selectively depositing a molten thermoplastic material (P) on the film or sheet.

In some embodiments, the present disclosure provides a 3D printing kit made from or containing:

(K1) a thermoplastic material (P) for extrusion-based additive manufacturing; and (K2) a printing plate made from or containing the film or sheet.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the following detailed description is to be regarded as illustrative in nature and not restrictive.

DETAILED DESCRIPTION OF THE INVENTION

In the present disclosure, the percentages are expressed by weight, unless otherwise specified.

In the present disclosure, when the term "comprising" is referred to a polymer or to a polymer composition, mixture, or blend, the term should be construed to mean "comprising or consisting essentially of".

In the present disclosure, the term "consisting essentially of" means that, in addition to the specified components, the polymer, the polyolefin composition, the polyolefin mixture, or the polyolefin blend may be further made from or containing other components, provided that the characteristics of the polymer or of the composition, mixture or blend are not materially affected by the presence of the other components. In some embodiments, the other components are catalyst residues, antistatic agents, melt stabilizers, light stabilizers, antioxidants, and antiacids.

As used herein, the term "film" refers to a layer of material having a thickness equal to or lower than 5000 μm.

As used herein, the term "sheet" refers to a layer of material having a thickness greater than 5000 μm.

As used herein, the terms "additive manufacturing" and "3D printing" are synonyms.

As used herein, the "top layer" of a multilayer article refers to the layer onto which the printing material is deposited in 3D printing.

In some embodiments, component (A) is selected from the group consisting of propylene homopolymers, propylene copolymers, and propylene heterophasic polymers. In some embodiments, component (A) is a propylene polymer selected from the group consisting of propylene homopolymers and propylene copolymers with an alpha-olefin of formula $CH_2$═CHR, where R is H or a linear or branched C2-C8 alkyl. In some embodiments, the propylene copolymer is made from or containing up to 6.0% by weight, alternatively 0.5-6.0% by weight, alternatively 0.5-5.0% by weight, of units deriving from the alpha-olefin, based on the weight of the propylene copolymer.

In some embodiments, the alpha-olefin is selected from the group consisting of ethylene, butene-1, hexene-1, 4-methyl-pentene-1, octene-1, and combinations thereof. In some embodiments, the alpha-olefin is ethylene.

In some embodiments, component (A) is a propylene homopolymer.

In some embodiments, component (A) has at least one of the following properties:

MFR(A), determined according to the method ISO 1133 (230° C., 2.16 kg), ranging from 0.5 to 200 g/10 min., alternatively from 1 to 100 g/10 min., alternatively from 3 to 70 g/10 min., alternatively from 5 to 30 g/10 min.;

lower than 12.0% by weight, alternatively lower than 10.0% by weight, alternatively lower than 5.0% by weight, alternatively lower than 3.0% by weight, of a fraction soluble in xylene at 25° C. XS(A), based on the weight of the component (A); and tensile modulus at 23° C., measured according to the method DIN EN ISO 527-1, -2, ranging from 1200 to 2000 MPa, alternatively from 1300 to 1600 MPa.

In some embodiments, component (A) has the properties above. In some embodiments, component (A) is a propylene homopolymer with the properties above.

In some embodiments, polyolefins for use as component (A) are commercially available. In some embodiments, polyolefins for use as component (A) are obtained by polymerizing the monomers in the presence of a catalyst selected from the group consisting of metallocene compounds, highly stereospecific Ziegler-Natta catalyst systems, and combinations thereof.

In some embodiments, the polymerization process to prepare component (A) is carried out in the presence of a highly stereospecific Ziegler-Natta catalyst system made from or containing:

(1) a solid catalyst component made from or containing a magnesium halide support on which a Ti compound having a Ti-halogen bond is present, and a stereoregulating internal donor;

(2) optionally, an Al-containing cocatalyst; and (3) optionally, a further electron-donor compound (external donor).

In some embodiments, the solid catalyst component (1) is made from or containing $TiCl_4$ in an amount securing the presence of from 0.5 to 10% by weight of Ti with respect to the total weight of the solid catalyst component (1).

In some embodiments, the solid catalyst component (1) is made from or containing a stereoregulating internal electron donor compound selected from mono or bidentate organic Lewis bases. In some embodiments, the solid catalyst component (1) is made from or containing a stereoregulating internal electron donor compound selected from the group consisting of esters, ketones, amines, amides, carbamates, carbonates, ethers, nitriles, alkoxysilanes, and combinations thereof.

In some embodiments, the donors are the esters of phthalic acids. In some embodiments, the esters of phthalic acids are as described in European Patent Application Nos. EP45977A2 and EP395083A2. In some embodiments, the esters of phthalic acids are selected from the group consisting of di-isobutyl phthalate, di-n-butyl phthalate, di-n-octyl phthalate, diphenyl phthalate, benzylbutyl phthalate, and combinations thereof.

In some embodiments, the esters of aliphatic acids are selected from the group consisting of esters of malonic acids, esters of glutaric acids, and esters of succinic acids. In some embodiments, the esters of malonic acids are as described in Patent Cooperation Treaty Publication Nos. WO98/056830, WO98/056833, and WO98/056834. In some embodiments, the esters of glutaric acids are as described in Patent Cooperation Treaty Publication No. WO00/55215. In some embodiments, the esters of succinic acids are as described in Patent Cooperation Treaty Publication No. WO00/63261.

In some embodiments, the stereoregulating internal electron donor compound are diesters derived from esterification of aliphatic or aromatic diols. In some embodiments, the diesters are as described in WO2010/078494 and U.S. Pat. No. 7,388,061.

In some embodiments, the internal donor is selected from 1,3-diethers. In some embodiments, the 1,3-diethers are as described in European Patent No. EP361493, European Patent No. EP728769, and Patent Cooperation Treaty Publication No. WO02/100904.

In some embodiments, the internal donor is a mixture of aliphatic or aromatic mono or dicarboxylic acid esters and 1,3-diethers as described in Patent Cooperation Treaty Publication Nos. WO07/57160 and WO2011/061134.

In some embodiments, the magnesium halide support is magnesium dihalide.

In some embodiments, the amount of internal donor that remains fixed on the solid catalyst component (1) is 5 to 20% by moles, with respect to the magnesium dihalide.

In some embodiments, the solid catalyst component (1) is prepared as described in European Patent Application No. EP395083A2.

In some embodiments, the catalyst components are prepared as described in U.S. Pat. Nos. 4,399,054, 4,469,648, Patent Cooperation Treaty Publication No. WO98/44009A1, and European Patent Application No. EP395083A2.

In some embodiments, the catalyst system is made from or containing an Al-containing cocatalyst (2) selected from Al-trialkyls. In some embodiments, the Al-containing cocatalyst (2) is selected from the group consisting of Al-triethyl, Al-triisobutyl, and Al-tri-n-butyl. In some embodiments, the Al/Ti weight ratio in the catalyst system is from 1 to 1000, alternatively from 20 to 800.

In some embodiments, the catalyst system is further made from or containing electron donor compound (3) (external electron donor). In some embodiments, the external electron donor is selected from the group consisting of silicon compounds, ethers, esters, amines, heterocyclic compounds, and ketones. In some embodiments, the heterocyclic compound is 2,2,6,6-tetramethylpiperidine.

In some embodiments, the silicon compounds are selected from the group consisting of methylcyclohexyldimethoxysilane (C-donor), dicyclopentyldimethoxysilane (D-donor), and mixtures thereof.

In some embodiments, the polymerization is continuous or batch. In some embodiments, the polymerization is carried out in at least one polymerization stage, in liquid phase, or in gas phase.

In some embodiments, the liquid-phase polymerization is in slurry, solution, or bulk (liquid monomer). In some embodiments, the liquid-phase polymerization is carried out in various types of reactors. In some embodiments, the reactors are continuous stirred tank reactors, loop reactors, or plug-flow reactors.

In some embodiments, the gas-phase polymerization stages are carried out in gas-phase reactors. In some embodiments, the gas-phase reactors are fluidized or stirred, fixed bed reactors. In some embodiments, the gas-phase polymerization stages are carried out in a multizone reactor. In some embodiments, the gas-phase polymerization stages are as described in European Patent No. EP1012195.

In some embodiments, the reaction temperature is in the range from 40° C. to 90° C. In some embodiments, the polymerization pressure is from 3.3 to 4.3 MPa for a process in liquid phase. In some embodiments, the polymerization pressure is from 0.5 to 3.0 MPa for a process in the gas phase.

In some embodiments, the molecular weight of the propylene copolymers is regulated using chain transfer agents. In some embodiments, the chain transfer agent is hydrogen or $ZnEt_2$.

In some embodiments, component (B) is a low molecular weight compound having a polar group. In some embodiments, component (B) is selected from the group consisting of aminosilanes, epoxysilanes, amidosilanes, acrylosilanes, and mixtures thereof. In some embodiments, component (B) is an aminosilane.

In some embodiments, component (B) is made from or containing a modified polymer functionalized with polar compounds and, optionally, with a low molecular weight compound having a reactive polar group. In some embodiments, the modified polymer is an olefin polymer, alternatively a polyolefin selected from the group consisting of polyethylenes, polypropylenes, and mixtures thereof.

In some embodiments, the polypropylenes are selected from the group consisting of propylene homopolymers, propylene copolymers with an alpha-olefin of formula $CH_2{=}CHR$, where R is H or a linear or branched C2-C8 alkyl, and mixtures thereof.

In some embodiments, the polyethylenes are selected from the group consisting of HDPE, MDPE, LDPE, LLDPE, and mixtures thereof.

In some embodiments, the modified olefin polymers are selected from the group consisting of graft copolymers, block copolymers, and mixtures thereof.

In some embodiments, the modified polymers are functionalized with groups derived from polar compounds. In some embodiment, the polar compounds are selected from the group consisting of acid anhydrides, carboxylic acids, carboxylic acid derivatives, primary and secondary amines, hydroxyl compounds, oxazoline, epoxides, ionic compounds, and combinations thereof. In some embodiments, the polar compounds are selected from unsaturated cyclic anhydrides, aliphatic diesters, and diacid derivatives.

In some embodiments, component (B) is a polyolefin, alternatively selected from the group consisting of polyethylenes, polypropylenes, and mixtures thereof, functionalized with a compound selected from the group consisting of maleic anhydride, C1-C10 linear or branched dialkyl maleates, C1-C10 linear or branched dialkyl fumarates, itaconic anhydride, C1-C10 linear or branched itaconic acid, dialkyl esters, maleic acid, fumaric acid, itaconic acid, and mixtures thereof.

In some embodiments, component (B) is a polyethylene (MAH-g-PE) or a polypropylene (MAH-g-PP), grafted with maleic anhydride.

In some embodiments, component (B) is a polyethylene or a polypropylene grafted with maleic anhydride, having at least one of the following properties:

- a maleic anhydride graft level equal to or greater than 0.25 wt. %, alternatively equal to or greater than 0.5 wt. %, alternatively of from 0.5 wt. % to 3.0 wt. %, based on the weight of component (B);
- a melt flow rate MFR(B), determined according to the method ISO 1133 (190° C., 2.16 kg), ranging from 1.0 g/10 min to 50 g/10 min; and
- a melting temperature, determined by DSC, equal to or higher than 60° C., alternatively from 60° C. to 130° C.

In some embodiments, the polyethylene or the polypropylene, grafted with maleic anhydride, has the properties above.

In some embodiments, the modified polymers are produced by functionalization processes carried out in solution, in the solid state, or in the molten state. In some embodiments, the modified polymers are produced by functionalization processes carried out in the molten state. In some embodiments, the molten state involves reactive extrusion of the polymer in the presence of the grafting compound and of a free radical initiator. In some embodiments, the functionalization of polypropylene or polyethylene, with maleic anhydride is as described in European Patent Application No. EP0572028A1.

In some embodiments, the modified polyolefin is commercially available under the tradename: Amplify™ TY by The Dow Chemical Company, Exxelor™ by ExxonMobil Chemical Company, Scona® TPPP by Byk (Altana Group), Bondyram® by Polyram Group, and Polybond® by Chemtura.

In some embodiments, amino resins are resins formed by condensation polymerization of compounds containing an amino group and formaldehyde. In some embodiments, component (C) is an amino resin containing an amino group selected from the group consisting of primary aliphatic amine, secondary aliphatic amine, cycloaliphatic amine, aromatic amine, polyamines, urea, urea derivatives, and mixtures thereof.

In some embodiments, component (C) is selected from the group consisting of urea-formaldehyde resins, melamine-formaldehyde resins, melamine-urea copolymer resins, and mixtures thereof. In some embodiments, component (C) is a melamine-formaldehyde resin. Melamine-formaldehyde resins includes modified melamine-formaldehyde resins. In some embodiments, the modified melamine-formaldehyde resins are ether-modified melamine formaldehyde resins.

In some embodiments, the solubility in water at 25° C. of the amino resin is equal to or greater than 1% by weight, alternatively equal to or higher than 10% by weight, alternatively equal to or higher than 20% by weight. In some embodiments, the amino resin is a melamine-formaldehyde resin. In some embodiments, the upper limit of the solubility in water is 70% by weight.

In some embodiments, the amino resins are obtained by condensation processes of the monomers. In some embodiments, the amino resins are commercially available under the tradenames Saduren® from BASF, Maprenal® from Prefere Resins Holding GmbH, and Hiperesin from Chemisol Italia Srl.

In some embodiments, component (D) is selected from the group consisting of antistatic agents, anti-oxidants, slipping agents, anti-acids, melt stabilizers, nucleating agents, and combinations thereof.

The amount of component (D) refers to the total amount of the additives in the mixture.

In some embodiments, the polymer blend is obtained/obtainable by melt blending a mixture made from or containing:

(A) 65% to 95% by weight, alternatively from 70% to 90% by weight, alternatively from 72% to 85% by weight, of a polyolefin;

(B) 0.1% to 30% by weight, alternatively 5% to 30% by weight, alternatively from 10 to 25% by weight, alternatively from 15% to 25% by weight, of a compatibilizer;

(C) 0.05% to 20% by weight, alternatively 0.05% to 10% by weight, alternatively from 0.1% to 7% by weight, alternatively from 0.5% to 5% by weight, of an amino resin; and (D) 0% to 5% by weight, alternatively 0.01% to 4% by weight, alternatively 0.05% to 3% by weight, alternatively from 0.06% to 2.5% by weight of an additive, wherein the amounts of (A), (B), (C), and (D) are based on the total weight of (A)+(B)+(C)+(D), the total weight being 100%.

In some embodiments, the polymer blend is obtained/obtainable by melt blending a mixture consisting of components (A), (B), (C), and optionally (D) in the amounts indicated above. In some embodiments, the polymer blend is obtained/obtainable by melt blending a mixture consisting of components (A), (B), (C), and (D).

In some embodiments, the film or sheet is made from or containing a polymer blend obtained/obtainable by melt blending a mixture further made from or containing (E) up to 30% by weight, alternatively from 10% to 30% by weight, of an inorganic filler, the amount of (E) being referred to the total weight of (A)+(B)+(C)+(D)+(E), the total weight being 100%.

In some embodiments, the inorganic filler is selected from the group consisting of minerals, glass fibers, glass beads, carbon fibers, natural fibers, and mixtures thereof. In some embodiments, the minerals are selected from the group consisting of talc and silico-aluminates.

In some embodiments, the polymer blend has a MFR (TOT), measured according to the method ISO 1133-2:2011 (230° C./2.16 Kg), of less than 100 g/10 min., alternatively from 0.1 to 100 g/10 min., alternatively from 0.5 to 70 g/10 min.

In some embodiments, the melt blending process includes the step of extruding components (A), (B), (C), and optionally (D), (E), or both, into an extruder operated at a temperature higher than the melting temperature of component (A).

In some embodiments, the melt blending process includes the steps of:

(i) providing components (A), (B), (C), and optionally (D), (E), or both, to an extruder, alternatively to a twin-screw extruder;

(ii) heating components (A), (B), (C), and optionally (D), (E), or both, to a temperature higher than the melting temperature of component (A), thereby forming a molten polymer blend; and (iii) pushing the molten polymer blend through a die and solidifying the molten polymer blend.

In some embodiments and in step (i), components (A), (B), (C), and optionally (D), (E), or both, are metered to the extruder simultaneously, optionally pre-mixed in the dry state. In some embodiments and in step (i), components (A), (B), (C), and optionally (D), (E), or both, are metered to the extruder sequentially in any order.

In some embodiments and in step (ii), components (A), (B), (C), and optionally (D), (E), or both, are heated to a temperature of from 180° C. to 270° C., alternatively of from 200° C. to 250° C. As used herein and in some embodiments, the temperature refers to the temperature of the head zone of the extruder.

In some embodiments, step (iii) further includes (iiia) pelletizing the molten polymer blend or (iiib) forming the molten polymer blend into a film or sheet.

In pelletizing, the molten extrudate exiting the die is cooled to solidification and subsequently cut into pellets, alternatively, the molten extrudate is cut into pellets as the molten extrudate emerges from the die, which are subsequently cooled. In some embodiments, cutting and cooling are carried out in water or air.

In some embodiments, the molten polymer blend is formed into a film or sheet by cast film/sheet extrusion or blown film/sheet extrusion. In cast film/sheet extrusion, the molten polymer blend (extrudate) exiting a linear slit die is cooled to the solid state by contact with chill rolls and wound onto reels. In blown film/sheet extrusion, the molten polymer blend (extrudate) exiting an annular die as a tube is cooled by air supplied from the inside of the tube. The inflated air prevents the film/sheet from collapsing.

In some embodiments and in step (iii), the molten polymer blend is formed into a film or sheet. In some embodiments, the melt blending process includes an additional step (iv) of stretching (orienting) the film or sheet in a direction, alternatively in two directions (machine and transverse direction). In some embodiments, stretching of the film or sheet in two directions is carried out sequentially or simultaneously. In some embodiments, sequential stretching uses a tenter frame. In some embodiments, simultaneous stretching uses a tenter frame or a tubular process.

In some embodiments, the film or sheet is obtained/obtainable by feeding the pelletized polyolefin blend to an extruder, alternatively to a twin screw extruder, remelting the pelletized polyolefin blend, and extruding the remolten polyolefin blend through a die. In some embodiments, extrusion of the remolten polyolefin blend through a die is achieved by cast film/sheet extrusion or blown film/sheet extrusion.

In some embodiments, the remelting temperature is from 180° C. to 270° C., alternatively of from 200° C. to 250° C.

In some embodiments, the film or sheet is a monolayer film or sheet made from or containing the polyolefin blend. In some embodiments, the monolayer film or sheet is made from or containing the polyolefin blend. In some embodiments, the monolayer film or sheet consists of the polyolefin blend.

In some embodiments, the film or sheet is a monolayer film having a thickness of from 1 to 5000 μm, alternatively 10 to 2000 μm, alternatively 10 to 200 μm, alternatively 20 to 80 μm.

In some embodiments, the film or sheet is a multilayer article made from or containing a top layer and a base layer, wherein the top layer is made from or containing the polyolefin blend and the base layer is made from or containing a material selected from the group consisting of metals, polymers, ceramic, glass, and combinations thereof. In some embodiments, the top layer consists of the polyolefin blend and the base layer consists of a material selected from the group consisting of metals, polymers, ceramic, glass, and combinations thereof.

In some embodiments, the film or sheet is a two-layer article consisting of a top layer and a base layer, wherein the top layer is made from or containing the polyolefin blend and the base layer is made from or containing a material selected from the group consisting of metals, polymers, ceramic, glass, and combinations thereof.

In some embodiments, the two-layer article consists of a top layer and a base layer, wherein the top layer consists of the polymer blend and the base layer consists of a material selected from the group consisting of metals, polymers, ceramic, glass, and combinations thereof.

In some embodiments, the film or sheet is a multilayer article, alternatively a two-layer article, made from or containing a top layer and a base layer, wherein the top layer is made from or containing the polyolefin blend and has a thickness of from 1 to 5000 μm, alternatively 10 to 2000 μm, alternatively 10 to 200 μm, alternatively 20 to 80 μm, and the base layer is made from or containing a material selected from the group consisting of metals, polymers, ceramic, glass, and combinations thereof and has a thickness of from 3 μm to 20000 μm, alternatively from 100 μm to 5000 μm, depending on the material.

In some embodiments, the multilayer article is further made from or containing an additional layer or an intermediate layer. In some embodiments, the additional layer is a reinforcing layer adhered to the surface of the base layer opposite to the surface onto which the top layer is arranged. In some embodiments, the intermediate layer is interposed between the top layer and the base layer.

In some embodiments, the base layer is made from or containing a thermoplastic polyolefin selected from the group consisting of polyethylene, polypropylene, polybutene-1, polyvinyl chloride, polyether, polyketone, poly etherketone, polyester, polyacrylate, polymethacrylate, polyamide, polycarbonate, polyurethane, polythiophenylene, polybutene terephthalate, polystyrene, and mixtures thereof.

In some embodiments, the thermoplastic polymer is a polyolefin selected from the group consisting of polypropylene, polyethylene, polybutene-1, and mixtures thereof. In some embodiments, the polyolefin is a propylene polymer selected from the group consisting of propylene homopolymers, propylene copolymers with an alpha-olefin of formula $CH_2{=}CHR$, where R is H or a linear or branched C2-C8 alkyl, and mixtures thereof.

In some embodiments, the propylene copolymer is a random propylene copolymer or an heterophasic propylene polymer made from or containing a matrix and a dispersed elastomeric phase, wherein the matrix is made from or containing a propylene homopolymer, a random propylene copolymer made from or containing 0.1-15% by weight of an alpha-olefin of formula $CH_2{=}CHR$, where R is H or a linear or branched C2-C8 alkyl, and mixtures thereof, and the dispersed phase is made from or containing a propylene copolymer made from or containing 15-80% by weight of monomer units deriving from an alpha-olefin of formula $CH_2{=}CHR$, where R is H or a linear or branched C2-C8 alkyl and mixtures thereof. In some embodiments, the random propylene copolymer is made from or containing 0.1-15% by weight of an alpha-olefin.

In some embodiments, the alpha-olefin is selected from the group consisting of ethylene, butene-1, hexene-1, 4-methy-pentene-1, octene-1, and combinations thereof. In some embodiments, the alpha-olefin is ethylene.

In some embodiments, the thermoplastic polyolefin of the base layer is made from or containing up to 60% by weight, alternatively 1-60% by weight, of an additive selected from the group consisting of fillers, pigments, dyes, extension oils, flame retardants, UV resistants, UV stabilizers, lubricants, antiblocking agents, slip agents, waxes, coupling agents for fillers, and combinations thereof, based on the weight of the base layer. In some embodiments, the flame retardant is aluminum trihydrate. In some embodiments, the UV resistant is titanium dioxide. In some embodiments, the lubricant is oleamide.

In some embodiments, the base layer is made from or containing a thermoplastic polyolefin, alternatively a propylene polymer, and up to 40% by weight, alternatively 10-40% by weight, alternatively 20-40% by weight, of a mineral filler, alternatively of talc, based on the weight of the base layer. In some embodiments, the base layer consists of the thermoplastic polymer, alternatively of the polyolefin described above. In some embodiments, the base layer consists of the thermoplastic polymer, alternatively of the polyolefin, described above and the additive.

In some embodiments, the metal of the base layer is selected from the group consisting of aluminum, copper, iron, steel, titanium, lithium, gold, silver, manganese, platinum, palladium, nickel, cobalt, tin, vanadium, chromium, alloys made from or containing the metals, and combinations thereof. In some embodiments, the alloy is brass. In some embodiments, the base layer is made from or containing aluminum. In some embodiments, the base layer consists of aluminum.

In some embodiments, the base layer is in the form of a film, sheet, woven or nonwoven fabric, web, or foam.

In some embodiments, the film or sheet is a two-layer article consisting of a top layer and a base layer, wherein the top layer consists of the polymer blend and the base layer consists of a metal as described above. In some embodiments, the top layer and the base layer have the thickness as described above.

In some embodiments, the film or sheet is a two-layer article consisting of top layer and a base layer, wherein the top layer is made from or containing the polyolefin blend and has a thickness of from 10 to 200 μm, alternatively from 20 to 80 μm, and the base layer consists of an aluminum film having thickness of from 30 to 500 μm, alternatively from 100 to 300 μm.

In some embodiments, the process to produce the multilayer article is selected from the group consisting of coextrusion, lamination, extrusion lamination, extrusion coating, compression molding, back injection molding, back foaming, back compression molding, and combinations thereof.

In coextrusion, the multilayer article is formed by cooling an extrudate made from or containing superimposed melt streams, wherein a first melt stream is made from or containing the material of the top layer and a second melt stream is made from or containing the material of base layer. In some embodiments, the material of the base layer is made from or containing a thermoplastic or a thermoset polymer.

In lamination, the base layer and the top layer are made to adhere using heated compression rollers. In some embodiments, the material of the base layer is made from or containing a thermoplastic polymer.

In extrusion lamination, the top layer and the base layer are laminated with heated compression rollers while a molten polymer is extruded between the top and base layers, thereby acting as a bonding layer.

In extrusion coating, a molten stream made from or containing the material of the top layer is extruded through a horizontal die and applied onto the moving base layer.

In compression molding, the base layer and the top layer are superimposed and made to adhere and by putting the superimposed films into an open heated cavity of a mold, closing the mold with a plug member, and applying pressure. In some embodiments, the multilayer article is shaped in the mold.

In some embodiments and in back injection molding, the base layer is introduced into an injection mold, the mold is closed, and a molten stream made from or containing the polymer blend of the top layer is injected into the mold at a temperature of from 160° C. to 270° C. and a pressure of from 0.1 to 200 MPa, thereby forming the top layer and bonding the top layer to the base layer. In some embodiments, the base layer is made from or containing a thermoplastic polymer, the top layer is introduced into an injection mold, the mold is closed, and a molten stream made from or containing the material of the base layer is injected into the mold and bonded to the top layer.

In some embodiments, the present disclosure provides an extrusion-based additive manufacturing process including the step of selectively depositing a molten thermoplastic material (P) on a film or sheet, as a printing plate, with a 3D printing device.

In some embodiments, the present disclosure provides an extrusion-based additive manufacturing process including a step of selectively depositing a molten thermoplastic material (P) on a printing plate made from or containing the film or sheet.

In some embodiments, the extrusion-based additive manufacturing process includes the steps of: (i) placing the film or sheet on the printing platform of a 3D printing device, thereby permitting the film or sheet to serve as a printing plate;

(ii) selectively depositing a molten thermoplastic material (P) on the printing plate, thereby obtaining a 3D printed article; and (iii) optionally removing the printing plate from the 3D printed article.

In some embodiments and before placing the film or sheet on the printing platform of a 3D printing device, the film or sheet is cut into pieces.

In some embodiments, step (i) includes laying the film or sheet on the printing platform, releasably fixing the film or sheet to the printing platform, or coating the printing platform with a continuous layer made from or containing the film or sheet.

In some embodiments, printing platforms of 3D printers are made of metal or glass and the film or sheet are displaced during printing. In some embodiments, step (i) includes releasably fixing the film or sheet to the printing platform of the 3D printing device.

In some embodiments, the film or sheet is releasably fixed to the printing platform by gluing the film or sheet to the printing plate with a releasable adhesive, by vacuum clamping, mechanical clamping, magnetic clamping, or combinations thereof.

In some embodiments, step (i) includes vacuum-clamping the film or sheet to the printing platform. In some embodiments, a vacuum clamping printing platform is made from or containing a vacuum chamber connected to the surface of the platform by holes of variable bore, spacing, and geometry. By applying vacuum to the chamber, the film or sheet is retained on the surface of the printing platform. In some embodiments, the vacuum ensures that the film or sheet is flat, wrinkle-free, and positionally stable during printing.

In some embodiments, step (i) includes coating the printing platform with a continuous layer of the polymer blend, thereby forming a film or sheet. In some embodiments, the coating is realized by an extrusion-based additive manufacturing process.

In some embodiments, the polymer blend is a printing material (P) in an extrusion-based additive manufacturing process.

In some embodiments, step (i) further includes heating the printing platform, alternatively the vacuum-clamping printing platform, to a temperature up to 150° C., alternatively up to 130° C. In some embodiments, the lower limit for the heating temperature is of 30° C.

In some embodiments, the thermoplastic material (P) of step (ii) is selected from the group consisting of polyolefins, polylactic acid (PLA), polyamides (PA), polycarbonates (PC), polyurethanes (TPU), polyesters, glycol-modified polyethylene terephthalates (PETG), polyhydroxy butyrate (PHB), polyetherketones, polyacrylates, polymethacrylates, poly(methyl methacrylate), polythiophenylene, acrylonitrile-butadiene-styrene polymers (ABS), acrylonitrile-styrene-acrylate polymers (ASA), the polymer blend, and combinations thereof. In some embodiments, the polyamides (PA) are selected from the group consisting of PA6 and PA6,6. In some embodiments, the polyesters are polyethylene terephthalates (PET). In some embodiments, the polyetherketones are polyetherketoneketone (PEKK) or polyetheretherketone (PEEK).

In some embodiments, the thermoplastic material (P) is made from or containing a propylene polymer or an ethylene polymer.

In some embodiments, the thermoplastic material (P) is a polyolefin composition selected from the group consisting of:

(I) a polyethylene composition having a melt flow index MIE at 190° C. with a load of 2.16 kg, according to ISO 1133-2:2011, of at least 0.1 g/10 min., alternatively at least 0.5 g/10 min., and made from or containing:

a1) 1-40% by weight of a polyethylene component having a weight average molar mass Mw, as measured by GPC, equal to or higher than 1,000,000 g/mol, b1) 1-95% by weight of a polyethylene component having a Mw value from 50,000 to 500,000 g/mol, and c1) 1-59% by weight of a polyethylene component having a Mw value equal to or lower than 5,000 g/mol, wherein the amounts of components a1), b1), and c1) are referred to the total weight of a1)+b1)+c1), the total weight being 100%;

(II) a heterophasic polypropylene composition made from or containing:

a2) up to 65 wt. % of a propylene homopolymer or a propylene-ethylene copolymer matrix phase, and b2) up to 35 wt. % of a propylene-ethylene copolymer elastomeric phase, wherein the amounts of components a2) and b2) are referred to the total weight of a2)+b2), the total weight being 100%, and wherein the heterophasic polypropylene composition has a xylene soluble content of from 15 wt. % to 50 wt. %, based upon the total weight of the heterophasic polypropylene composition, an intrinsic viscosity of the fraction soluble in xylene at 25° C. ranging from 1.5 to 6.0 dl/g, an ethylene content from 10 wt. % to 50 wt. %, based upon the total weight of the heterophasic polypropylene composition, and a melt flow rate MFR L (ISO 1133, condition L, i.e. 230° C. and 2.16 kg load) of from 0.5 to 100 g/10 min.;

(III) a polypropylene composition made from or containing:

a3) 20-60% by weight of a heterophasic propylene copolymer, b3) 5-33% by weight of a propylene homopolymer or copolymer, wherein the copolymer is made from or containing up to 5% by weight of an alpha-olefin selected from the group consisting of ethylene, 1-butene, 1-hexene, and 1-octene, c3) 2-15% by weight of an elastomeric block copolymer made from or containing styrene, d3) 4-32% by weight of an elastomeric ethylene copolymer, e3) 5-50% by weight of an inorganic filler, alternatively glass, and f3) 0.1-5% by weight of a compatibilizer, wherein the amounts of components a3), b3), c3), d3), e3), and f3) are referred to the total weight of a3), b3), c3), d3), e3), and f3), which amounts to 100%, and wherein the polypropylene composition has a melt flow rate MFR (230° C., load 2.16 kg, measured according to ISO 1133-2:2011) of at least 1.0 g/10 min; and (IV) combinations thereof.

In some embodiments, polyethylene composition (I) is a multimodal polyethylene composition as described Patent Cooperation Treaty Publication No. WO2020/169423, herein incorporated by reference in its entirety.

In some embodiments, heterophasic polypropylene composition (II) is made from or containing up to 40% by weight of an inorganic filler c2) and up to 5% by weight of a compatibilizer d2).

In some embodiments, the inorganic filler c2) of heterophasic polypropylene composition (II) and the inorganic filler e3) of polypropylene composition (III) are independently selected from the group consisting of talc, mica, calcium carbonate, wollastonite, glass, carbon, and combinations thereof. In some embodiments, the glass is selected from the group consisting of glass fibers and glass spheres.

In some embodiments, compatibilizer d2) is a polyethylene (MAH-g-PE) or a polypropylene (MAH-g-PP), grafted with maleic anhydride.

In some embodiments, heterophasic polypropylene composition (II) is as described in Patent Cooperation Treaty Application No. PCT/EP2020/077033, herein incorporated by reference in its entirety.

In some embodiments, polypropylene composition (III) is as described in Patent Cooperation Treaty Application No. PCT/EP2020/077034, herein incorporated by reference in its entirety.

In some embodiments, the thermoplastic material (P) is fed to the 3D printing device in the form of a filament (filament-based 3D printing process) or of a pellet (pellet-based 3D printing process).

In some embodiments, the printing temperature of the thermoplastic polymer (P) in step (ii) is up to 450° C. In some embodiments, the thermoplastic polymer (P) is PEEK. In some embodiments, the printing temperatures of polyolefins are from 190° C. to 260° C.

In some embodiments, the 3D printed article is not removed from the printing plate. In some embodiments, step (ii) further includes the step of removing the 3D printed article and the printing plate from the printing platform of the printing device. In some embodiments, the removal step is achieved by interrupting the vacuum.

In some embodiments, step (iii) includes removing the 3D printed article and the printing plate from the printing platform of the printing device and subsequently removing the printing plate from the 3D printed article. In some embodiments, the removal of the printing plate from the printing platform of the printing device is achieved by interrupting the vacuum.

In some embodiments, step (iii) includes removing the 3D printed article from the printing plate while retaining the printing plate on the printing platform.

In some embodiments, the present disclosure provides a 3D printing kit made from or containing:

(K1) a thermoplastic material (P) for extrusion-based additive manufacturing; and (K2) a printing plate made from or containing the film or sheet.

In some embodiments, component (K1) of the 3D printing kit is made from or containing a thermoplastic polymer (P), alternatively a polyolefin composition selected from the group consisting of the polyolefin composition (I), (II), (III), and (IV).

The features describing the subject matter of the present disclosure are not inextricably linked to each other. In some embodiments, a level of a feature does not involve the same level of the remaining features of the same or different components. In some embodiments, a range of features of components from (A) to (D) is combined independently from the level of the other components, and that components from (A) to (D) are combined with an additional component and the component's features.

EXAMPLES

The following examples are illustrative and not intended to limit the scope of the disclosure in any manner whatsoever.

Characterization Methods

The following methods are used to determine the properties indicated in the description, claims and examples.

Melt Flow Rate: Determined according to the method ISO 1133 (230° C., 2.16 Kg for the thermoplastic polyolefins; 190° C./2.16 Kg for the compatibilizer).

Solubility in xylene at 25° C.: 2.5 g of polymer sample and 250 ml of xylene were introduced into a glass flask equipped with a refrigerator and a magnetic stirrer. The temperature was raised in 30 minutes up to 135° C. The resulting clear solution was kept under reflux and stirred for further 30 minutes. The solution was cooled in two stages. In the first stage, the temperature was lowered to 100° C. in air for 10 to 15 minutes under stirring. In the second stage, the flask was transferred to a thermostatically-controlled water bath at 25° C. for 30 minutes. The temperature was lowered to 25° C. without stirring during the first 20 minutes and maintained at 25° C. with stirring for the last 10 minutes. The formed solid was filtered on quick filtering paper (for example, Whatman filtering paper grade 4 or 541). 100 ml of the filtered solution (51) was poured into a pre-weighed aluminum container, which was heated to 140° C. on a heating plate under nitrogen flow, thereby removing the solvent by evaporation. The container was then kept in an oven at 80° C. under vacuum until constant weight was reached. The amount of polymer soluble in xylene at 25° C. was then calculated. XS(I) and $XS_A$ values were experimentally determined. The fraction of component (B) soluble in xylene at 25° C. ($XS_B$) was calculated from the formula:

$$XS = W(A)\times(XS_A) + W(B)\times(XS_B)$$

wherein W(A) and W(B) are the relative amounts of components (A) and (B), respectively, and W(A)+W(B)=1.

C2 content in propylene-ethylene copolymer (II): $^{13}$C NMR spectra were acquired on a Bruker AV-600 spectrometer equipped with cryoprobe, operating at 160.91 MHz in the Fourier transform mode at 120° C. The peak of the $P_{\beta\beta}$ carbon (nomenclature according to C. J. Carman, R. A. Harrington and C. E. Wilkes, *Macromolecules,* 10, 3, 536 (1977)) was used as internal standard at 2.8 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD, thereby removing $^{1}$H-$^{13}$C coupling. 512 transients were stored in 32K data points using a spectral window of 9000 Hz. The assignments of the spectra, the evaluation of triad distribution and the composition were made according to Kakugo [M. Kakugo, Y. Naito, K. Mizunuma and T. Miyatake, *Macromolecules,* 16, 4, 1160 (1982)]. In view of the amount of propylene inserted as regioirregular units, ethylene content was calculated according to Kakugo [M. Kakugo, Y. Naito, K. Mizunuma and T. Miyatake, *Macromolecules,* 16, 4, 1160 (1982)] using triad sequences with P inserted as regular unit.

$$PPP=100T_{\beta\beta}/S$$

$$PPE=100T_{\beta\delta}/S$$

$$EPE=100T_{\delta\delta}/S$$

$$PEP=100S_{\beta\beta}/S$$

$$PEE=100S_{\beta\delta}/S$$

$$EEE=100(0.25S_{\gamma\delta}+0.5S_{\delta\delta})/S$$

where $S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$ Melting temperature: by DSC.

Tensile Modulus: Determined according to the method ISO 527-1, -2:2019.

Peel test: the peel resistance Rpeel of 3D printed test specimens (200×15×0.8 mm) on the printing plate was determined according to DIN EN 1272 using the test machine ZWICK Z005 with a load cell of 2.5 kN. The 3D printed test specimen was separated from the printing plate along the longest axis by a blade, starting from a first side over a length of 5 cm. The separated part of the 3D printed test specimens was clamped to the testing machine at an angle of 90° with respect to the printing plate and peeled with a speed of 100 mm/min. For each 3D printed test specimen, the measurements were performed at a temperature corresponding to the temperature T(p) of the printing plate, directly after the printing process. A load cell was used to continuously measure the force to peel off the test specimens from the printing plate. From the plateau (traverse travel between approximately 60 mm and 160 mm), the peel force Fpeel was determined by arithmetically averaging the measured tensile forces in the plateau. The peel resistance Rpeel was calculated according to the formula:

$$R_{peel}\left[\frac{\mathrm{N}}{\mathrm{mm}}\right] = \frac{F_{peel}}{b}$$

wherein b is the width of the test specimens (15 mm). Five test specimens were used for each combination 3D printing material/printing plate. The mean value of the Rpeel over five measurements is used as Rpeel value of the test specimen.

Raw Materials:

Moplen HF501N, a propylene homopolymer commercially available from LyondellBasell, having a melt flow rate of 12 g/10 min. (ISO1133; 230° C./2.16 Kg) and a tensile modulus (ISO 527-1, -2:2019) of 1550 MPa.

Amplify TY 1060H a maleic anhydride (MAH) grafted polymer concentrate with MAH grafting level of 0.5-1.0 wt. %, commercially available from The Dow Chemical Company, having a MFR of 3.0 g/10 min. (ISO1133; 190° C./2.16 Kg) and a melting temperature of 62.8° C. measured by DSC.

Hiperesin MF 100C melamine-formaldehyde powder resin, commercially available from Chemisol Italia, having solubility in water in the range 30-65 wt. %.

Irganox® 1010 2,2-bis [3-[,5-bis(1,1-dimethyl ethyl)-4-hydroxyphenyl]-1-oxopropoxy]methyl]-1,3-propanediyl-3, 5-bis(1,1-dimethylethyl)-4-hydroxybenzene-propanoate, commercially available from BASF.

Irgafos® 168 tris(2,4-di-tert.-butylphenyl)phosphite, commercially available from BASF.

3D Printing Materials:

The thermoplastic polymer filaments used in 3D printing tests are listed in Table 1.

TABLE 1

| | |
|---|---|
| PM1 | Ultimaker Tough PLA white |
| PM2 | Ultimaker nylon translucent |
| PM3 | Ultimaker polycarbonate white |
| PM4 | Ultimaker TPU 95A white |
| PM5 | Ultimaker CPE translucent (PETG) |
| PM6 | Ultimaker propylene polymer, natural |
| PM7 | Ultrafuse propylene polymer, natural |
| PM8 | HECO1 |
| PM9 | Hifax TYC 459P C1V301 |
| PM10 | Hostalen GC7260 |

Ultimaker products were commercially available from Ultimaker, Nederlands; Ultrafuse was commercially available from BASF.

HECO1 is a polypropylene compound obtained by melt blending 70 wt. % of Moplen® 2000HEXP, an heterophasic propylene polymer, commercially available from LyondellBasell, with 25 wt. % of glass fibers (ThermoFlow 636 EC13 4 mm) and 5 wt. % of additives.

Hifax® TYC 459P C1V301 is a 21 wt. % talc filled commercial propylene polymer composition, commercially available from LyondellBasell, having a MFR (230° C./2.16 Kg) of 27 g/10 min. measured according to ISO 1133-1, a flexural modulus (23° C., Tech A) of 2100 MPa measured according to ISO 178/A1, and a Charpy impact strength—Notched of 25 kJ/m$^2$ at 23° C. and of 3.5 kJ/m$^2$ at −30° C., measured according to ISO 179-1/1eA.

Hostalen® GC7260, commercially available from LyondellBasell, is an HDPE having a Melt Flow Rate (190° C./2.16 Kg, ISO1133-1) of 8.0 g/10 min and a melting temperature in the range 180° C.-250° C.

Preparation of the Film IP1

A mixture having the following composition:

TABLE 2

| | | IP1 |
|---|---|---|
| Moplen HF501N | wt. % | 78.8 |
| Amplify TY 1060 | wt. % | 20.0 |
| Hiperesin MF 100C | wt. % | 1.0 |
| Irganox ® 1010 | wt. % | 0.1 |
| Irgafos 168 ® | wt. % | 0.1 |

was fed to a twin-screw extruder ZSK-25 (Coperion GmbH, Stuttgart, Germany), operating with a throughput of 10 kg/h at 210° C. The melt was pelletized through a die plate having 4 holes of 2 mm diameter resulting in granules of a polymer blend. The granules of polymer blend were fed to a blown-film line (HOSOKAWA ALPINE AG., Augsburg, Germany) equipped with a 55 mm diameter single screw extruder and blown into a film employing a throughput of 40 kg/h and a temperature of 210° C. in the head zone of the extruder. The extruded bubbles had a diameter of 800 mm. The bubbles were cut, and the resulting films, having a thickness of 40 vim, were wound onto a roll. For use as printing plate, the film was cut into pieces of 25×22 cm.

Preparation of the Film IP2

The film IP1 was laminated to an aluminum foil DPxx (anodized open pored) 200 μm thick, obtained from Alanod GmbH & Co. KG, Germany. The lamination was carried out continuously using a laminator UVL PRO 2911039 from Fetzel Maschinenbau GmbH, Germany with silicone rollers LA60AC0.01 at 170° C. and 15 bar/(m 2) surface pressure. The intake speed was 0.2 mm/min. For use as printing plate, the laminate was cut into pieces of size 25×22 cm.

3D Printing Process

The 3D printed test specimens (200×15×0.8 mm) were produced with an Ultimaker 2+ FFF printer using 100% linear infill with ±45° angle relative to the longest axis of the specimens, a nozzle of 0.4 mm diameter, a line width of 0.35 mm, and a printing speed of 35 mm/s.

The printing plates were vacuum-clamped onto the printing platform of the printer, and 4 layers each 0.2 mm thick were printed superimposed, leading to a test specimen 0.8 mm thick. The test specimens were printed without raft or brim. The nozzle printing temperature (T(n)) and temperature of the printing platform (T(p)) were set to avoid degradation of the printing materials.

Once the printing process was finished, the vacuum was switched off. The 3D printed articles were removed from the printing platform together with the printing plate.

The peel test was carried out immediately after the 3D printed article with the printing plate was removed from the platform.

For each combination of printing material/IP/printing temperature, five specimens were printed consecutively and tested.

Examples E1-E10

In Examples E1-E10, the film IP1 was used as printing plate with the printing materials from PM1 to PM10. The nozzle temperature T(n) and the temperature of the printing platform T(p) used in each test are reported in Table 3.

Examples E11-E20

In Examples E11-E20, the film IP2 was used as printing plate with the printing materials from PM1 to PM10. The nozzle temperature T(n) and the temperature of the printing platform T(p) used in each test are reported in Table 3.

Examples E21-E30

In Examples E1-E10, the film IP2 was used as printing plate with the printing materials from PM1 to PM10. The nozzle temperature T(n) and the temperature of the printing platform T(p) used in each test are reported in Table 3.

Comparative Examples CE31-CE40

In Comparative Examples CE31-CE40, the printing platform CP1 was used, wherein a Ultimaker 2+ glass bed from Ultimaker, Netherlands, was covered with 3DLac adhesive spray for 3D printers obtained from 3DLac, Spain. The same materials from PM1 to PM10 were used for printing. The nozzle temperature T(n) and the temperature of the printing platform T(p) used in each test are reported in Table 4.

Comparative Examples CE41-CE50

In Comparative Examples CE41-CE50, the printing platform CP2 was used, wherein an Ultimaker adhesion sheet from Ultimaker, Netherlands, was applied on an Ultimaker 2+ glass bed. The same printing materials from PM1 to PM10 were used for printing. The nozzle temperature T(n) and the temperature of the printing platform T(p) used in each test are reported in Table 4.

Comparative Examples CE51-CE60

In Comparative Examples CE51-CE60, the printing platform CP3 was used, wherein a reinforced adhesive tape from 3M, USA (Scotch Filament Tape 8959), was applied on a Ultimaker 2+ glass bed. The same materials from PM1 to PM10 were used for printing. The nozzle temperature T(n) and the temperature of the printing platform T(p) used in each test are reported in Table 4.

Comparative Examples CE61-CE70

In Comparative Examples CE61-CE70, the printing platform CP4 was used, a polypropylene plate with a thickness of 4 mm from Technoplast GmbH, Germany. The same printing materials from PM1 to PM10 were used for printing. The nozzle temperature T(n) and the temperature of the printing platform T(p) used in each test are reported in Table 4.

Comparative Examples CE71-CE80

In Comparative Examples CE71-CE80, the printing platform CP5 was used, a polyethylene plate with a thickness of 4 mm from Technoplast GmbH, Germany. The same printing materials from PM1 to PM10 were used for printing. The nozzle temperature T(n) and the temperature of the printing platform T(p) used in each test are reported in Table 4. The peel resistance values (Rpeel [N/mm] with standard deviation) obtained from the peel tests are reported in Tables 5 and 6.

TABLE 3

| | IP1 | IP2 | IP2 |
|---|---|---|---|
| PM1 | E1: T(n) = 210° C. T(p) = 60° C. | E11: T(n) = 210° C. T(p) = 60° C. | E21: T(n) = 240° C. T(p) = 60° C. |
| PM2 | E2: T(n) = 240° C. T(p) = 60° C. | E12: T(n) = 240° C. T(p) = 60° C. | E22-E23: T(n) = 260° C. T(p) = 60° C. |
| PM3 | E3: T(n) = 250° C. T(p) = 60° C. | E13: T(n) = 250° C. T(p) = 60° C. | |
| PM4 | E4: T(n) = 220° C. T(p) = 60° C. | E14: T(n) = 220° C. T(p) = 60° C. | E24: T(n) = 240° C. T(p) = 60° C. |

TABLE 3-continued

| | IP1 | IP2 | IP2 |
|---|---|---|---|
| PM5 | E5: T(n) = 235° C. T(p) = 60° C. | E15: T(n) = 235° C. T(p) = 60° C. | E25-30: T(n) = 260° C. T(p) = 60° C. |
| PM6 PM7 PM8 PM9 PM10 | E6-E10: T(n) = 210° C. T(p) = 60° C. | E16-E20: T(n) = 210° C. T(p) = 60° C. | |

TABLE 4

| | CP1 | CP2 | CP3 | CP4 | CP5 |
|---|---|---|---|---|---|
| PM1 | CE31: T(n) = 210° C. T(p) = 60° C. | CE41: T(n) = 210° C. T(p) = 60° C. | CE51: T(n) = 210° C. T(p) = 60° C. | CE61: T(n) = 240° C. T(p) = 60° C. | CE71: T(n) = 240° C. T(p) = 60° C. |
| PM2 | CE32: T(n) = 260° C. T(p) = 60° C. | CE42: T(n) = 260° C. T(p) = 60° C. | CE52: T(n) = 260° C. T(p) = 60° C. | CE62-CE63: T(n) = 260° C. T(p) = 60° C. | CE72-CE73: T(n) = 260° C. T(p) = 60° C. |
| PM3 | CE33: T(n) = 260° C. T(p) = 110° C. | CE43: T(n) = 260° C. T(p) = 110° C. | CE53: T(n) = 260° C. T(p) = 110° C. | | |
| PM4 | CE34: T(n) = 240° C. T(p) = 70° C. | CE44: T(n) = 240° C. T(p) = 70° C. | CE54: T(n) = 240° C. T(p) = 70° C. | CE64: T(n) = 240° C. T(p) = 60° C. | CE74: T(n) = 240° C. T(p) = 60° C. |
| PM5 PM6 PM7 PM8 PM9 PM10 | CE35-CE40: T(n) = 260° C. T(p) = 60° C. | CE45-CE50: T(n) = 260° C. T(p) = 60° C. | CE55-CE60: T(n) = 260° C. T(p) = 60° C. | CE65-CE70: T(n) = 260° C. T(p) = 60° C. | CE75-CE80: T(n) = 260° C. T(p) = 60° C. |

TABLE 5

| | IP1 | IP2 | IP2 |
|---|---|---|---|
| PM1 | E1: 0.15 (±0.05) | E11: 0.13 (±0.03) | E21: 0.29 (±0.03) |
| PM2 | E2: 0.52 (±0.08) | E12: 0.58 (±0.09) | E22: 0.74 (±0.12) |
| PM3 | E3: 0.07 (±0.03) | E13: 0.072 (±0.009) | E23: 0.16 (±0.02) |
| PM4 | E4: 0.41 (±0.06) | E14: 0.39 (±0.08) | E24: 0.46 (±0.06) |
| PM5 | E5: 0.091 (±0.011) | E15: 0.09 (±0.02) | E25: 0.14 (±0.02) |
| PM6 | E6: 0.60 (±0.08) | E16: 0.52 (±0.07) | E26: 2.6 (±0.3) |
| PM7 | E7: 0.45 (±0.10) | E17: 0.43 (±0.05) | E27: 2.5 (±0.5) |
| PM8 | E8: 0.40 (±0.09) | E18: 0.41 (±0.06) | E28: 2.5 (±0.3) |
| PM9 | E9: 0.37 (±0.07) | E19: 0.41 (±0.05) | E29: 1.66 (±0.11) |
| PM10 | E10: 0.32 (±0.04) | E20: 0.33 (±0.05) | E30: 1.5 (±0.2) |

TABLE 6

| | CP1 | CP2 | CP3 | CP4 | CP5 |
|---|---|---|---|---|---|
| PM1 | CE31: 0.33 (±0.08) | CE41: 0.27 (±0.11) | CE51: 0.12 (±0.03) | CE61-CE65: no adhesion | CE71: 0.07 (±0.03) |
| PM2 | CE32: 0.26 (±0.06) | CE42: 0.13 (±0.03) | CE52: 0.13 (±0.04) | | CE72: no adhesion |
| PM3 | CE33: 0.12 (±0.02) | CE43: 0.11 (±0.02) | CE53: 0.13 (±0.07) | | CE73: no adhesion |

TABLE 6-continued

| | CP1 | CP2 | CP3 | CP4 | CP5 |
|---|---|---|---|---|---|
| PM4 | CE34: 0.35 (±0.07) | CE44: 0.51 (±0.05) | CE54: 0.13 (±0.05) | | CE74: 0.06 (±0.05) |
| PM5 | CE35: 0.09 (±0.02) | CE45: 0.08 (±0.02) | CE55: no adhesion | | CE75: no adhesion |
| PM6 | CE36: no adhesion | CE46: 0.06 (±0.02) | CE56: 0.5 (±0.3) | CE66-CE70: no peeling, specimens rupture | CE76: 0.12 (±0.04) |
| PM7 | CE37: no adhesion | CE47: 0.07 (±0.03) | CE57: 0.7 (±0.3) | | CE77: 0.13 (±0.06) |
| PM8 | CE38: no adhesion | CE48: no adhesion | CE58: 0.35 (±0.10) | | CE78: 1.7 (±0.6) |
| PM9 | CE39: no adhesion | CE49: no adhesion | CE59: 0.16 (±0.02) | | CE79: 1.6 (±0.5) |
| PM10 | CE40: no adhesion | CE50: no adhesion | CE60: 0.34 (±0.18) | | CE80: no peeling, specimens rupture |

What is claimed is:

1. An extrusion-based additive manufacturing process comprising the step of:

(a) selectively depositing a molten thermoplastic material (P) on a film or sheet comprising a polymer blend obtained by melt blending a mixture comprising (A) 60% to 98.8% by weight of a polyolefin;

(B) 0.1% to 30% by weight of a compatibilizer;

(C) 0.05% to 20% by weight of an amino resin; and (D) 0% to 5% by weight of an additive, wherein the amounts of (A), (B), (C), and (D) are based on the total weight of (A)+(B)+(C)+(D), the total weight being 100%.

2. The extrusion-based additive manufacturing process according to claim 1, wherein the step of selectively depositing the molten thermoplastic material (P) on the film or sheet comprises the steps of:

(i) placing the film or sheet on a printing platform of a 3D printing device, thereby permitting the film or sheet to serve as a printing plate;

(ii) selectively depositing the molten thermoplastic material (P) on the printing plate, thereby obtaining a 3D printed article; and (iii) optionally removing the printing plate from the 3D printed article.

3. The extrusion-based additive manufacturing process according to claim 1, wherein the thermoplastic material (P) is selected from the group consisting of polyolefins, polylactic acid (PLA), polyamides (PA), polycarbonates (PC), polyurethanes (TPU), polyesters (PE), polyethylene terephthalates (PET), glycol-modified polyethylene terephthalates (PETG), polyhydroxy butyrate (PHB), polyetherketones, polyacrylates, polymethacrylates, poly(methyl methacrylates), polythiophenylene, acrylonitrile-butadiene-styrene polymers (ABS), acrylonitrile-styrene-acrylate polymers (ASA), the polymer blend, and combinations thereof.

4. The extrusion-based manufacturing process according to claim 1, wherein the thermoplastic material (P) is a polyolefin composition selected from the group consisting of:

(I) a polyethylene composition having a melt flow index MIE at 190° C. with a load of 2.16 kg, according to ISO 1133-2:2011, of at least 0.1 g/10 min., comprising:

a1) 1-40% by weight of a polyethylene component having a weight average molar mass Mw, as measured by GPC, equal to or higher than 1,000,000 g/mol, b1) 1-95% by weight of a polyethylene component having a Mw value from 50,000 to 500,000 g/mol, and c1) 1-59% by weight of a polyethylene component having a Mw value equal to or lower than 5,000 g/mol, wherein the amounts of components a1), b1), and c1) are referred to the total weight of a1)+b1)+c1), the total weight being 100%;

(II) a heterophasic polypropylene composition containing a matrix and a dispersed elastomeric phase, wherein the heterophasic polypropylene composition comprises:

a2) up to 65 wt. % of a propylene homopolymer or a propylene-ethylene copolymer as the matrix, and b2) up to 35 wt. % of a propylene-ethylene copolymer as the dispersed elastomeric phase, wherein the amounts of components a2) and b2) are referred to the total weight of a2)+b2), the total weight being 100%, and wherein the heterophasic polypropylene composition has a xylene-soluble content of from 15 wt. % to 50 wt. %, based upon the total weight of the heterophasic polypropylene composition, an intrinsic viscosity of the fraction soluble in xylene at 25° C. ranging from 1.5 to 6.0 dl/g, an ethylene content from 10 wt. % to 50 wt. %, based upon the total weight of the heterophasic polypropylene composition, and a melt flow rate MFR L (ISO 1133, condition L, 230° C. and 2.16 kg load) of from 0.5 to 100 g/10 min.;

(III) a polypropylene composition comprising:

a3) 20-60% by weight of a heterophasic propylene copolymer;

b3) 5-33% by weight of a propylene homopolymer or copolymer, wherein the copolymer comprises up to 5% by weight, based on the total weight of the copolymer, of an alpha-olefin selected from the group consisting of ethylene, 1-butene, 1-hexene, and 1-octene;

c3) 2-15% by weight of an elastomeric block copolymer comprising styrene, d3) 4-32% by weight of an elastomeric ethylene copolymer, e3) 5-50% by weight of an inorganic filler, and f3) 0.1-5% by weight of a compatibilizer, wherein the amounts of components a3), b3), c3), d3), e3), and f3) are referred to the total weight of a3), b3), c3), d3), e3) and f3), which amounts to 100%, and wherein the polypropylene composition has a melt flow rate MFR (230° C., load 2.16 kg, measured according to ISO 1133-2:2011) of at least 1.0 g/10 min; and (IV) combinations thereof.

5. The extrusion-based additive manufacturing process according to claim 1, wherein the thermoplastic polymer (P) is fed to a 3D printing device in a form of a filament or of a pellet.

6. The extrusion-based additive manufacturing process according to claim 1, wherein component (A) is a propylene polymer selected from the group consisting of propylene homopolymers and propylene copolymers with an alpha-olefin of formula $CH_2{=}CHR$, where R is H or a linear or branched C2-C8 alkyl, wherein the propylene copolymer comprises up to 6.0% by weight of units deriving from the alpha-olefin, based on the weight of the propylene copolymer.

7. The extrusion-based additive manufacturing process according to claim 1, wherein component (B) is a polyolefin selected from the group consisting of polyethylenes, polypropylenes, and mixtures thereof, functionalized with a compound selected from the group consisting of maleic anhydride, C1-C10 linear or branched dialkyl maleates, C1-C10 linear or branched dialkyl fumarates, itaconic anhydride, C1-C10 linear or branched itaconic acid, dialkyl esters, maleic acid, fumaric acid, itaconic acid, and mixtures thereof.

8. The extrusion-based additive manufacturing process according to claim 1, wherein component (C) is selected from the group consisting of urea-formaldehyde resins, melamine-formaldehyde resins, melamine-urea copolymer resins, and mixtures thereof.

9. The extrusion-based additive manufacturing process according to claim 1, wherein component (D) is selected from the group consisting of antistatic agents, anti-oxidants, slipping agents, anti-acids, melt stabilizers, nucleating agents, and combinations thereof.

10. The extrusion-based additive manufacturing process according to claim 1, wherein the film or sheet is a monolayer film having a thickness of from 1 to 5000 μm.

11. The extrusion-based additive manufacturing process according to claim 1, wherein the sheet is a multilayer article comprising a top layer and a base layer, wherein the top layer comprises the polyolefin polymer blend and has a thickness from 1 to 5000 μm and the base layer comprises a material selected from the group consisting of metals, polymers, ceramic, glass, and combinations thereof, and has a thickness of from 3 μm to 20,000 μm.

12. The extrusion-based additive manufacturing process according to claim 11, wherein the base layer is a metallic layer comprising a metal selected from the group consisting of aluminum, copper, iron, steel, titanium, lithium, gold, silver, manganese, platinum, palladium, nickel, cobalt, tin, vanadium, chromium, alloys comprising the metals, and combinations thereof.

* * * * *